United States Patent [19]

Fast

[11] Patent Number: 5,209,009
[45] Date of Patent: May 11, 1993

[54] TACKLE BOX FISHING ROD HOLDER

[76] Inventor: Barbara L. Fast, 8150 Bernice, Center Line, Mich. 48015

[21] Appl. No.: 814,377

[22] Filed: Dec. 26, 1991

[51] Int. Cl.⁵ ............................................. A01K 97/00
[52] U.S. Cl. ...................................... 43/54.1; 43/21.2
[58] Field of Search ................................ 43/54.1, 21.2

[56] References Cited

U.S. PATENT DOCUMENTS

| | | | |
|---|---|---|---|
| 2,491,008 | 12/1949 | Lake | 43/21.2 |
| 2,576,624 | 11/1951 | Miller | 43/21.2 |
| 2,658,650 | 11/1953 | Jasper | 224/200 |
| 2,995,855 | 8/1961 | Bell | 43/21.2 |
| 3,021,101 | 2/1962 | Gliebe | 43/21.2 |
| 3,159,939 | 12/1964 | Transeau . | |
| 3,543,432 | 12/1970 | Gates | 43/54.1 |
| 3,603,019 | 9/1971 | Smeltzer | 43/21.2 |
| 3,638,843 | 2/1972 | Ortynski | 224/199 |
| 3,653,144 | 4/1972 | Rocka | 43/54.1 |
| 3,667,708 | 6/1972 | Smeltzer | 43/21.2 |
| 3,802,112 | 4/1974 | Banner | 43/21.2 |
| 3,874,573 | 4/1975 | Francella et al. . | |
| 4,014,128 | 3/1977 | Hrdlicka | 43/54.1 |
| 4,081,115 | 3/1978 | White et al. . | |
| 4,095,364 | 6/1989 | Prine | 43/54.1 |
| 4,323,181 | 4/1982 | Spasoff | 43/21.2 |
| 4,534,063 | 8/1985 | Krumin et al. | 224/199 |
| 4,587,757 | 5/1986 | Lirette . | |
| 4,669,214 | 6/1987 | Behrle . | |
| 4,817,323 | 4/1989 | Braid . | |
| 4,828,152 | 5/1989 | Pepping . | |
| 4,845,881 | 7/1989 | Ward | 43/54.1 |
| 5,044,109 | 9/1991 | Fast . | |

Primary Examiner—Richard K. Seidel
Assistant Examiner—Chuck Y. Mah
Attorney, Agent, or Firm—Peter D. Keefe

[57] ABSTRACT

A fishing rod holder composed of a pressure distributing back plate, a fishing rod handle receptacle mounted to a front side of the back plate, and a tackle box sidewall connection member connected with the back side of the back plate for securing the back plate to a sidewall of the tackle box, preferably an end sidewall thereof. The preferred structure of the connection member is either a plurality of fasteners that engage aligned holes in the tackle box sidewall and the back plate, or a double sided foam adhesive material which adhesively engages the tackle box sidewall and the back plate. In operation, the fisherman would connect the back plate of the fishing rod holder to one of the end sidewalls of his or her tackle box. Thereafter, whenever the fisherman needs to change lures or otherwise service his or her tackle, the handle of the fishing rod is placed into the fishing rod handle receptacle while the fisherman accesses his or her tackle box and effects service of his or her tackle.

3 Claims, 1 Drawing Sheet

TACKLE BOX FISHING ROD HOLDER

BACKGROUND OF THE INVENTION

1. Field of the Invention

The present invention relates to holders for the handle portion of a fishing rod, and more particularly to a fishing rod holder which mounts to a tackle box.

2. Description of the Prior Art

Fishermen frequently must change lures or service their tackle while fishing. In so doing, they generally must place their fishing rod down, an act which risks the fishing rod being damaged by someone accidentally stepping on it. Also, fishermen who spend countless hours fishing, may desire from time to time to have at their disposal a convenient way in which to support their fishing rod for fishing other than by holding it in their hands.

There are attempts in the prior art to provide a fishing rod support mechanism, as follows. U.S. Pat. No. 3,159,939 to Transeau, dated Dec. 8, 1964, discloses a fishing rod pad which detachably interconnects with the handle of a fishing rod, but does not attach to the fisherman. U.S. Pat. No. 3,874,573 to Fruscell et al, dated Apr. 1, 1975, discloses a holster type of fishing rod holder which requires a belt and the fishing rod is held at the left side of the fisherman so that he or she may perform other tasks and not have to place the fishing rod down thereduring. U.S. Pat. No. 4,081,115 to White et al, dated Mar. 28, 1978, discloses a special belt having a front mount using a ball and socket system for holding a fishing rod at the handle end. U.S. Pat. No. 4,587,757 to Lirette, dated May 13, 1986, discloses a special belt having a pivotable mount for holding the handle end of a fishing rod. U.S. Pat. No. 4,669,214 to Behrle, dated Jun. 2, 1987, discloses a belt buckle for a special belt which connects with a spiral shaped fishing rod handle holder. U.S. Pat. No. 4,817,323 to Braid, dated Apr. 4, 1989, discloses a special belt which includes a fishing rod holder in the form of a rigid pad which accepts the fishing rod handle end at a "V" shaped rib. U.S. Pat. No. 4,828,152 to Pepping, dated May 9, 1989, discloses a belt-like fisherman's harness featuring a plate onto which the fishing rod is pivotably mounted, but also held secure by harness straps. Finally, U.S. Pat. No. 5,044,109 to Fast, dated Sep. 3, 1991, discloses a fishing rod holder which releasably mounts to the clothing of a fisherman.

While each of the foregoing devices attempts to solve the problem of holding a fishing rod, there yet remains the very definite need to provide a simple, inexpensive device which holds fishing rods by being connected with the fisherman's tackle box, a fisherman's tackle box being an omnipresent accessory of all fisherman.

SUMMARY OF THE INVENTION

The present invention is a fishing rod holder which is compact and easily mounted to the tackle box.

The fishing rod holder according to the present invention is composed of a pressure distributing back plate, a fishing rod handle receptacle mounted to a front side of the back plate, and a tackle box sidewall connection member connected with the back side of the back plate for securing the back plate to a sidewall of the tackle box, preferably an end sidewall thereof. The preferred structure of the connection member is either a plurality of fastener that engage aligned holes in the box sidewall and the back plate, or a double sided foam adhesive material which adhesively engages the tackle box sidewall and the back plate.

In operation, the fisherman would connect the back plate of the fishing rod holder to one of the end sidewalls of his or her tackle box. Thereafter, whenever the fisherman needs to change lures or otherwise service his or her tackle, the handle of the fishing rod is placed into the fishing rod handle receptacle while the fisherman accesses his or her tackle box and effects service of his or her tackle.

Accordingly, it is an object of the present invention to provide a fishing rod holder which is easily connected to a fisherman's tackle box.

It is an additional object of the present invention to provide a fishing rod holder which holds the fishing rod for the fisherman, thereby freeing him or her to use one or both hands for other than holding of the fishing rod.

It is still another object of the present invention to provide a fishing rod holder which is inexpensive, functional and durable.

These, and additional objects, advantages, features and benefits of the present invention will become apparent from the following specification.

DETAILED DESCRIPTION OF THE PREFERRED EMBODIMENT

Figure 1:
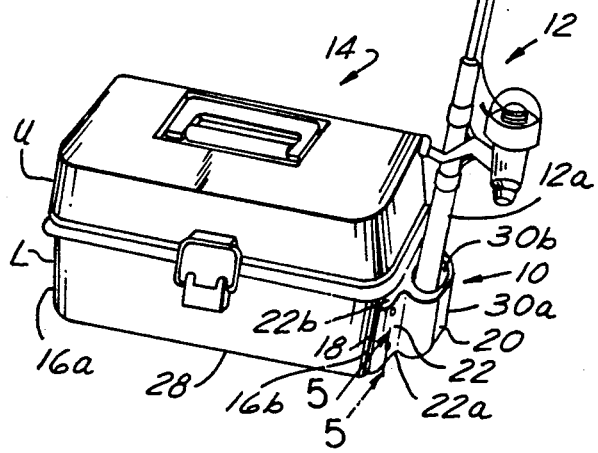
FIG. 1 is a perspective view of the fishing rod holder according to the present invention shown in operation in connection with a fishing rod and a tackle box.

Referring now to the Drawing, FIG. 1 shows the fishing rod holder 10 according to the present invention in operation with respect to a fishing rod 12 and a tackle box 14 having an upper component U and a lower component L. In this respect, the tackle box includes two end sidewalls 16a16b, to one of which the fishing rod holder 10 is preferably connected.

The fishing rod holder 10 is composed of a pressure distributing back plate 18, a fishing rod handle receptacle 20 mounted to a front side 22 of the back plate, and a tackle box sidewall connection member 24 connected with the back side 26 of the back plate for releasably securing the back plate to the sidewall 16a, 16b of a tackle box 14.

The back plate 18 is preferred to have a surface area which will allow for distribution of any forces generated by the weight of a fishing rod 12 received in the fishing rod handle receptacle 20 to be over an area of the tackle box sidewall large enough to prevent deformation or cracking of the sidewall 16a, 16b; and, further, is dimensioned so that forces generated in response to fish action, will also be distributed safely over the sidewall. It is also preferred for the back plate 18 to have uniformly varying thickness from top to bottom so as to offset the usual sidewall angle of a conventional tackle box, and thereby provide for a substantially vertical orientation of the fishing rod handle receptacle 20. As an example, the back plate 22 may be dimensioned in the neighborhood of 5.5 by 5.5 inches, and be about one-half inch thick at the bottom 22a and one-quarter inch thick at the top 22b.

It is preferred, but not required, for the fishing rod handle receptacle 20 be connected with the back plate 18 so that it is oriented substantially parallel relative to the back plate. Thus, when the handle 12a of a fishing rod 12 is mounted into the fishing rod handle receptacle 20, as shown in FIG. 1, the fishing rod will assume a substantially vertical orientation with respect to the horizontal, the horizontal being parallel with respect to the bottom 28 of the tackle box 14. A vertical orientation of the fishing rod 12 is preferred in order to ensure that the tackle box 14 does not tip over as a result of the moment created by an angled fishing rod. However, for heavier tackle boxes an angled orientation of the fishing rod handle receptacle 20 relative to the back plate 18 may be preferred, especially where the fishing rod is to be used for fishing while being received in the fishing rod handle receptacle. The fishing rod handle receptacle 20 is structured in the form of a cylindrical projection 30a having an interior blind bore 30b. The blind bore 30b is dimensioned so as to be able to receive the handle 12a of a standard fishing rod 12. It is preferred, but not required, to include one or more relief holes (not shown) in the cylindrical projection portion 30a for purposes of allowing water or other matter to escape freely from the blind bore 30b. The size of the fishing rod handle receptacle 20 should be such that the length of the blind bore 30b sufficient to assuredly hold the fishing rod handle 12a therewithin even during very heavy seas or demanding fishing action, when large forces can be applied thereto from the fishing rod. Typically, about a three to four inch blind bore 30b should be sufficient.

Figure 5:
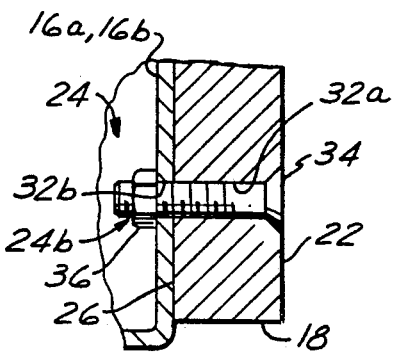
FIG. 5 is a sectional view of the fishing rod holder according to the present invention, seen along lines 5—5 in FIG. 1.
Figure 2:
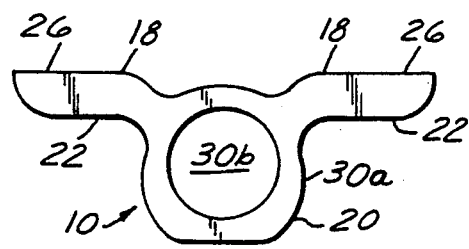
FIG. 2 is a plan view of the fishing rod holder according to the present invention.
Figure 3:
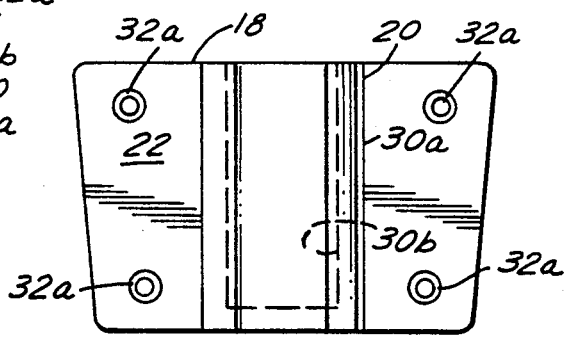
FIG. 3 is a front side view of the fishing rod holder according to the present invention, having a first preferred connection means.
Figure 6:
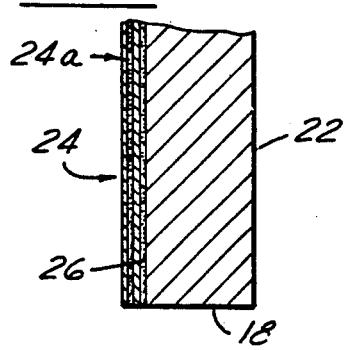
FIG. 6 is a sectional view of the fishing holder according to the present invention, seen along lines 6—6 in FIG. 4.
Figure 4:
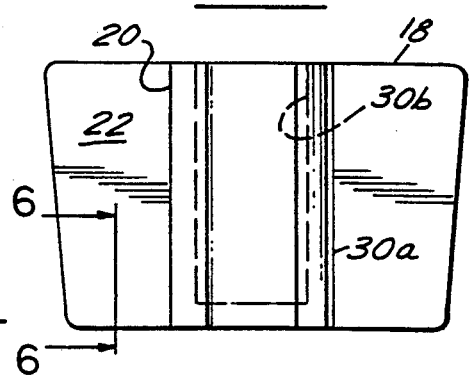
FIG 4 is a front side view of the fishing rod holder according to the present invention, having a second preferred connection means.

The preferred structure of tackle box sidewall connection member 24, as depicted in the Drawing, is that of either a two sided adhesive foam 24a or a plurality of fasteners 24b. In the case of the two side adhesive foam 24a, as indicated in FIGS. 4 and 6, one side thereof is adhesively connected to the back side 26 of the back plate; the other side thereof is connected to a sidewall 16a, 16b of the tackle box. In the case of the plurality of fasteners 24b, as indicated in FIGS. 3 and 5, a hole 32a is provided near each corner of the back plate 18 and aligned holes 32b are provided in a tackle box sidewall 16a, 16b so that a bolt 34 may pass therethrough and be secured by a nut 36.

It is preferred for the entire structure of the fishing rod holder 10 to be an integral single piece which may be preferably formed by casting or injection molding. It is further preferred to construct the fishing rod holder 10 of a light, durable, strong and non-corrosive material, such as plastic.

In operation, the fisherman would connect the back plate to a selected sidewall of his or her tackle box, preferably as shown in FIG. 1. Then, the fisherman would place the handle end of his or her fishing rod into the fishing rod handle receptacle whenever it is desired to have his or her hands free for adjusting tackle, fishing or simply storing the fishing rod out of the way.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A tackle box incorporating a fishing rod holder for selectively connecting a fishing rod with respect to a sidewall of the tackle box, said tackle box comprising:
   a tackle box, said tackle box having a lower component defined by a plurality of sidewalls and a bottom connected with said plurality of sidewalls, said tackle box further having an upper component hingeably connected with said lower component, said upper component and said lower component being dimensioned so that each substantially comprise substantially one-half of said tackle box;
   a back plate, said back plate having a front side and a rear side;
   a fishing rod handle receptacle means mounted to said front side of said back plate for releasably receiving a handle portion of a fishing rod, said fishing rod handle receptacle means comprising a generally cylindrically shaped projection member connected with said front side of said back plate, said generally cylindrically shaped projection member having an interior blind bore structured for receiving a handle portion of the fishing rod, wherein said blind bore of said generally cylindrically shaped projection member is oriented substantially parallel with respect to said back side of side back plate and substantially perpendicular with respect to said bottom; and
   tackle box sidewall connection member means connected with said rear side of said back plate for securing said back plate to a sidewall of said plurality of sidewalls of said lower component of said tackle box.

2. The tackle box claim 1, wherein said back plate has a thickness between said front and back sides thereof which offsets an angle of orientation of the sidewall of the tackle box so that said blind bore of said generally cylindrically shaped projection member is oriented perpendicular with respect to said bottom of said tackle box.

3. The tackle box of claim 1, wherein said tackle box connection member means comprises:
   said back plate having a first set of holes therein;
   a sidewall of the tackle box having a second set of holes therein, said second set of holes being aligned with said first set of holes to form a plurality of pairs of aligned holes; and
   a plurality of fasteners, a fastener of said plurality of fasteners respectively passing through each pair of aligned holes of said first and second set of holes.

* * * * *